(12) United States Patent
Cheng et al.

(10) Patent No.: US 8,584,549 B2
(45) Date of Patent: Nov. 19, 2013

(54) THROTTLE TWIST GRIP CONTROLLER WITH RING POTENTIOMETER ASSEMBLY

(75) Inventors: Wen Feng Cheng, Kaohsiung (TW); Yuan Pin Chen, Fongshan County (TW)

(73) Assignee: CTS Corporation, Elkhart, IN (US)

( * ) Notice: Subject to any disclaimer, the term of this patent is extended or adjusted under 35 U.S.C. 154(b) by 294 days.

(21) Appl. No.: 13/156,512

(22) Filed: Jun. 9, 2011

(65) Prior Publication Data

US 2011/0303041 A1 Dec. 15, 2011

Related U.S. Application Data

(60) Provisional application No. 61/355,041, filed on Jun. 15, 2010.

(51) Int. Cl.
*F16C 1/10* (2006.01)

(52) U.S. Cl.
USPC ............. 74/500.5; 74/501.6; 74/482; 74/485

(58) Field of Classification Search
USPC .......... 74/500.5, 501.6, 502.2, 504, 482, 485, 74/488
See application file for complete search history.

(56) References Cited

U.S. PATENT DOCUMENTS

| | | |
|---|---|---|
| 4,430,634 A | 2/1984 | Hufford et al. |
| 4,479,107 A | 10/1984 | Bleeke |
| 4,529,933 A | 7/1985 | Bleeke |
| 5,460,035 A | 10/1995 | Pfaffenberger |
| 5,520,044 A | 5/1996 | Pfaffenberger |
| 5,539,373 A | 7/1996 | Pfaffenberger et al. |
| 5,661,890 A | 9/1997 | Pfaffenberger |
| 5,828,290 A | 10/1998 | Buss et al. |
| 5,905,198 A | 5/1999 | Pfaffenberger |
| 5,963,124 A | 10/1999 | Buss et al. |
| 5,998,892 A | 12/1999 | Smith et al. |
| 6,018,992 A | 2/2000 | Kaijala |
| 6,031,448 A | 2/2000 | Starkweather et al. |
| 6,038,923 A | 3/2000 | Lin |
| 6,276,230 B1 | 8/2001 | Crum et al. |
| 6,323,643 B1 | 11/2001 | Kordecki |
| 6,329,897 B1 | 12/2001 | Osmer et al. |
| 6,362,719 B1 | 3/2002 | Osmer et al. |
| 6,639,508 B1 | 10/2003 | Martin |
| 6,920,805 B2 * | 7/2005 | Samoto et al. .................. 74/485 |
| 7,231,904 B2 * | 6/2007 | Hino et al. .................... 123/399 |
| 7,237,452 B2 * | 7/2007 | Hanai .............................. 74/491 |
| 7,675,283 B2 * | 3/2010 | Hino et al. ................. 324/207.2 |
| 7,735,392 B2 * | 6/2010 | Poulos et al. ................ 74/502.2 |
| 8,278,912 B2 * | 10/2012 | Cavallo ...................... 324/207.2 |
| 8,302,467 B2 * | 11/2012 | Tanaka et al. .............. 73/114.36 |
| 8,322,483 B2 * | 12/2012 | Sy et al. ........................ 180/444 |

(Continued)

*Primary Examiner* — David M Fenstermacher
(74) *Attorney, Agent, or Firm* — Daniel J. Deneufbourg

(57) ABSTRACT

A throttle twist grip controller assembly includes a rotatable hand grip, a throttle housing coupled to the hand grip, and a ring potentiometer assembly located in the throttle housing. In one embodiment, the ring potentiometer assembly is fitted and supported on a sleeve associated with the throttle housing. A ring rotor is seated in the ring potentiometer assembly, surrounds the sleeve of the throttle housing, and includes at least a first tab which couples the rotor to the hand grip for rotation with the hand grip. A second tab on the rotor holds a potentiometer conductor. A spring is fitted and supported on the sleeve of the throttle housing. One end of the spring is coupled to the hand grip and the other end is coupled to the throttle housing for returning the hand grip to idle.

11 Claims, 7 Drawing Sheets

(56) References Cited

U.S. PATENT DOCUMENTS

| | | |
|---|---|---|
| 8,353,111 B2 * | 1/2013 | Baldassari et al. ............ 33/1 PT |
| 2004/0065165 A1 * | 4/2004 | Sekiya et al. .................. 74/491 |
| 2004/0107789 A1 * | 6/2004 | Peppard ..................... 74/484 R |
| 2004/0216550 A1 * | 11/2004 | Fallak et al. ................. 74/551.9 |
| 2006/0082361 A1 * | 4/2006 | Hino et al. ................. 324/207.2 |
| 2006/0082362 A1 * | 4/2006 | Hino et al. ................. 324/207.2 |
| 2008/0114523 A1 * | 5/2008 | Dugas et al. .................. 701/101 |
| 2008/0154537 A1 * | 6/2008 | Gamberini et al. ........... 702/151 |
| 2010/0057322 A1 | 3/2010 | Chandran et al. |
| 2010/0126299 A1 * | 5/2010 | Baldassari et al. ............. 74/491 |
| 2010/0132500 A1 * | 6/2010 | Cominetti et al. .............. 74/504 |
| 2010/0326760 A1 * | 12/2010 | Dugas et al. .................. 180/335 |
| 2011/0303041 A1 * | 12/2011 | Cheng et al. .................... 74/488 |
| 2012/0111137 A1 * | 5/2012 | Bliss et al. ...................... 74/504 |
| 2012/0138375 A1 * | 6/2012 | Hughes ....................... 180/65.1 |

\* cited by examiner

THROTTLE TWIST GRIP CONTROLLER WITH RING POTENTIOMETER ASSEMBLY

CROSS-REFERENCE TO RELATED APPLICATIONS

This application claims the benefit of the filing date and disclosure of U.S. Provisional Patent Application Ser. No. 61/355,041 filed on Jun. 15, 2010, the entire disclosure of which is explicitly incorporated herein by reference as are all references cited therein.

FIELD OF THE INVENTION

The invention relates generally to throttle controllers and, more specifically, to a throttle twist grip controller with a ring position potentiometer assembly for controlling an engine, motor, or powered vehicle.

BACKGROUND OF THE INVENTION

Throttle twist grip controllers have been known in the art for controlling the speed and acceleration of a variety of machines such as, for example, personal motor craft, all-terrain vehicles, and a variety of two-wheeled powered vehicles including, for example, internal combustion engine powered vehicles or electric bicycles, scooters, and motorcycles.

The control circuitry associated with these throttle controllers has included the use of potentiometers for sensing the position of the throttle. A potentiometer is similar to the volume control used in radio and television receivers. A voltage is applied across the extreme ends of a resistor. An intermediate tap is provided between the two extreme ends of the resistor. The tap is mechanically linked to the device which is to be sensed, such as the throttle valve, and the position of the device is determined by the voltage at the intermediate tap. Thus, a precise position of a throttle may be determined by linking it to a potentiometer. U.S. Pat. No. 6,276,230 discloses one such handlebar throttle controller embodiment which uses a potentiometer.

The control circuitry associated with these throttle controllers has also included the use of magnet/Hall effect technology for sensing the position of the throttle. U.S. Pat. No. 6,038,923 discloses one such handlebar throttle controller which uses a magnet/Hall effect sensor type controller.

Although currently available throttle controllers with potentiometers or magnet/Hall effect technology have proven satisfactory, there remains a need for simpler and more cost effective throttle twist grip controller assemblies.

SUMMARY OF THE INVENTION

The present invention is directed generally to a throttle twist grip controller assembly comprising a rotatable handle grip, a throttle housing, and a ring-shaped potentiometer assembly located in the throttle housing and including a ring-shaped rotor coupled to the handle grip for rotation with the handle grip.

In one embodiment, the ring-shaped potentiometer assembly and the ring-shaped rotor define respective central apertures for fitting the ring-shaped potentiometer assembly in a relationship surrounding a sleeve.

In one embodiment, the throttle housing includes the sleeve and the throttle twist grip controller further comprises a spring fitted on and surrounding the sleeve and the spring includes one end coupled to the handle grip and an opposite end coupled to the throttle housing.

In one embodiment, the throttle housing defines a circumferential slot and the ring-shaped potentiometer assembly is fitted in the circumferential slot.

In one embodiment, the ring-shaped potentiometer assembly includes a potentiometer housing having a pair of spaced-apart circumferential walls defining an interior slot and the rotor includes a conductor extending into the slot.

In one embodiment, the potentiometer assembly includes at least a first strip of resistive material, the strip of resistive material being fitted in the slot in the potentiometer housing between the rotor and one of the pair of walls defining the slot.

The present invention is also directed to a throttle controller assembly comprising a rotatable handle grip, a throttle housing coupled to the rotatable handle grip and including a sleeve, and a potentiometer assembly surrounding the sleeve and including a rotor coupled for rotation with the handle grip.

In one embodiment, the potentiometer assembly is ring-shaped and defines a central aperture and the sleeve of the throttle housing extends through the central aperture of the potentiometer assembly.

In one embodiment, the throttle controller assembly further comprises a spiral spring fitted on the sleeve of the throttle housing and the spiral spring includes one end coupled to the handle grip and an opposite end coupled to the throttle housing.

In one embodiment, the rotor includes at least one tab fitted in a groove defined in the throttle housing and the throttle housing includes at least one tab fitted in a groove in the potentiometer assembly.

The present invention is further directed to a potentiometer assembly comprising a ring-shaped potentiometer housing including a first wall and defining a slot, a ring-shaped rotor mounted on the housing for rotation relative to the potentiometer housing and including at least a first conductor extending into the slot, and at least a first strip of resistive material fitted in the slot in the housing between the first wall and the first conductor.

In one embodiment, the potentiometer housing includes a second wall spaced from the first wall and together defining the slot, the second wall includes a top peripheral edge and the rotor includes a rotor plate seated against the top peripheral edge of the second wall.

In one embodiment, the rotor includes at least a first tab extending from the rotor plate and fitted in the slot in the potentiometer housing and adapted to hold the conductor.

In one embodiment, the rotor includes at least a second tab adapted for coupling to a rotatable control element and the second tab extends from the rotor plate in a direction opposite the first tab.

In one embodiment, each of the ring-shaped potentiometer housing and the ring-shaped rotor defines a central through aperture for mounting the potentiometer assembly in a relationship surrounding a sleeve.

There are other advantages and features of this invention which will be more readily apparent from the following detailed description of the embodiments of the invention, the drawings, and the appended claims.

BRIEF DESCRIPTION OF THE DRAWINGS

In the accompanying drawings that form part of the specification, and in which like numerals are employed to designate like parts throughout the same:

FIG. 1 is a broken perspective view of a throttle twist grip controller assembly in accordance with the present invention coupled to the end of the handlebar of a motorcycle, scooter or the like;

DETAILED DESCRIPTION OF THE EMBODIMENTS

Figure 1:
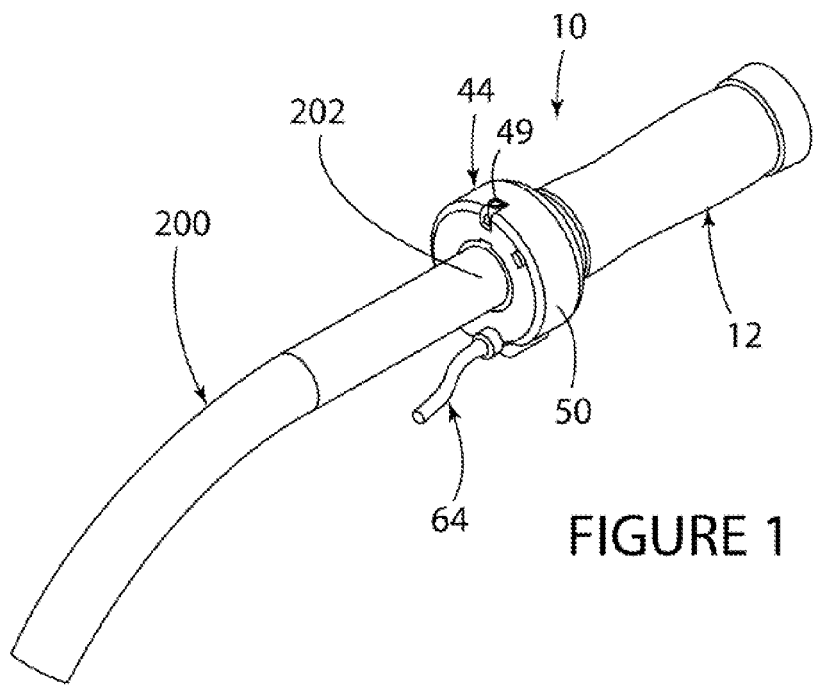

FIG. 1 depicts a throttle twist grip controller assembly 10 in accordance with the present invention coupled to the distal end 202 of a handlebar 200 used as a steering mechanism for several different types of vehicles including, for example, an electric bicycle, scooter, or motorcycle.

Figure 1A:
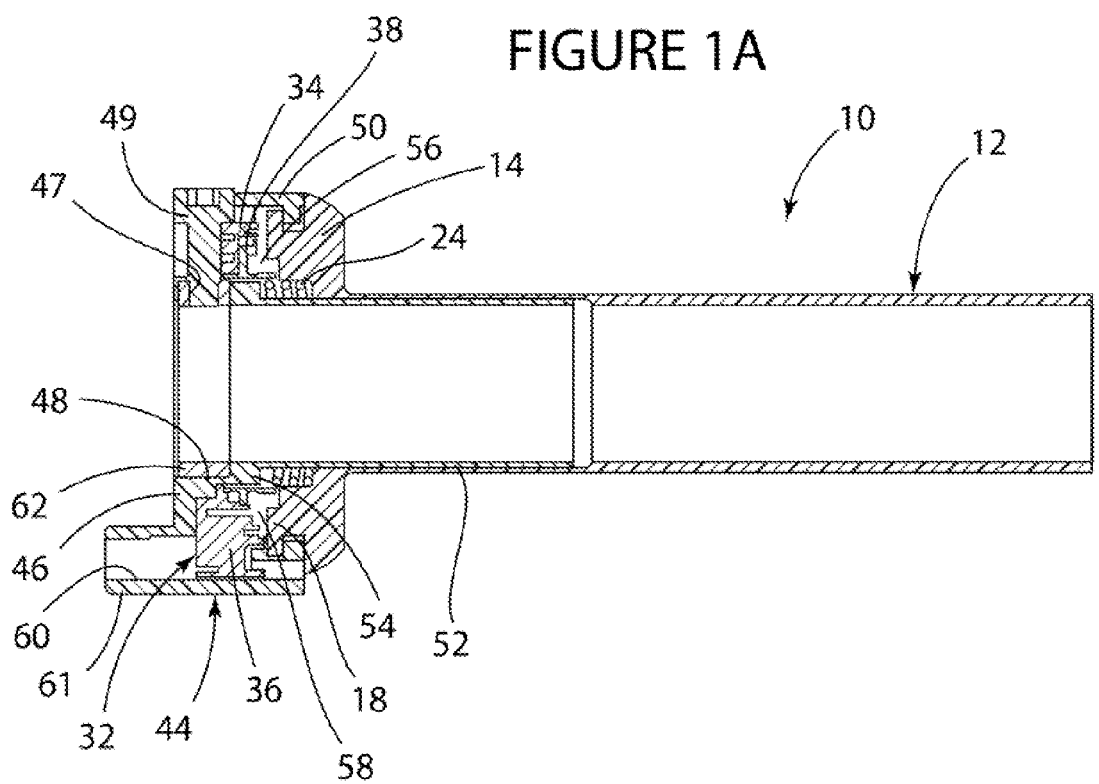
FIG. 1A is a vertical cross-sectional view of the throttle twist grip controller assembly shown in FIG. 1.
Figure 2:
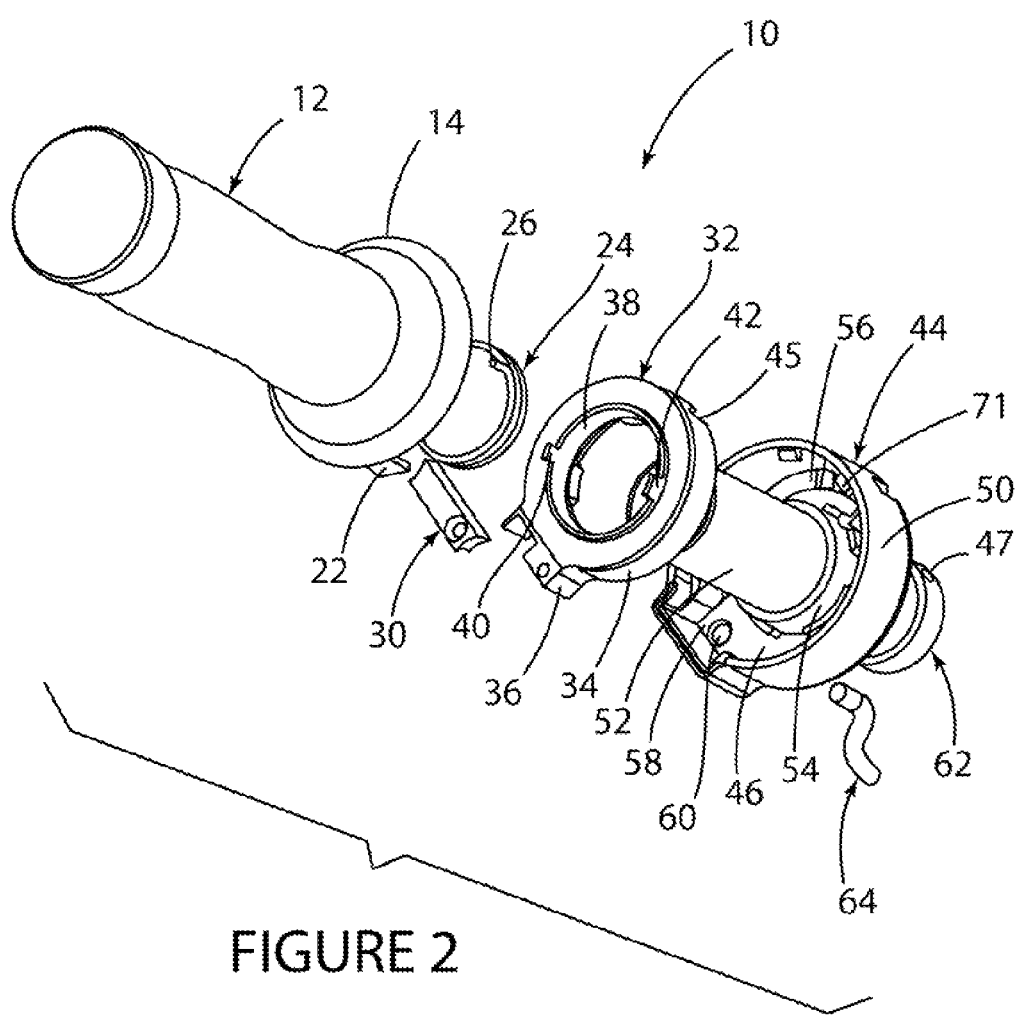
FIGS. 2 and 3 are respective exploded perspective views of the throttle twist grip controller assembly in accordance with the present invention.
Figure 3:
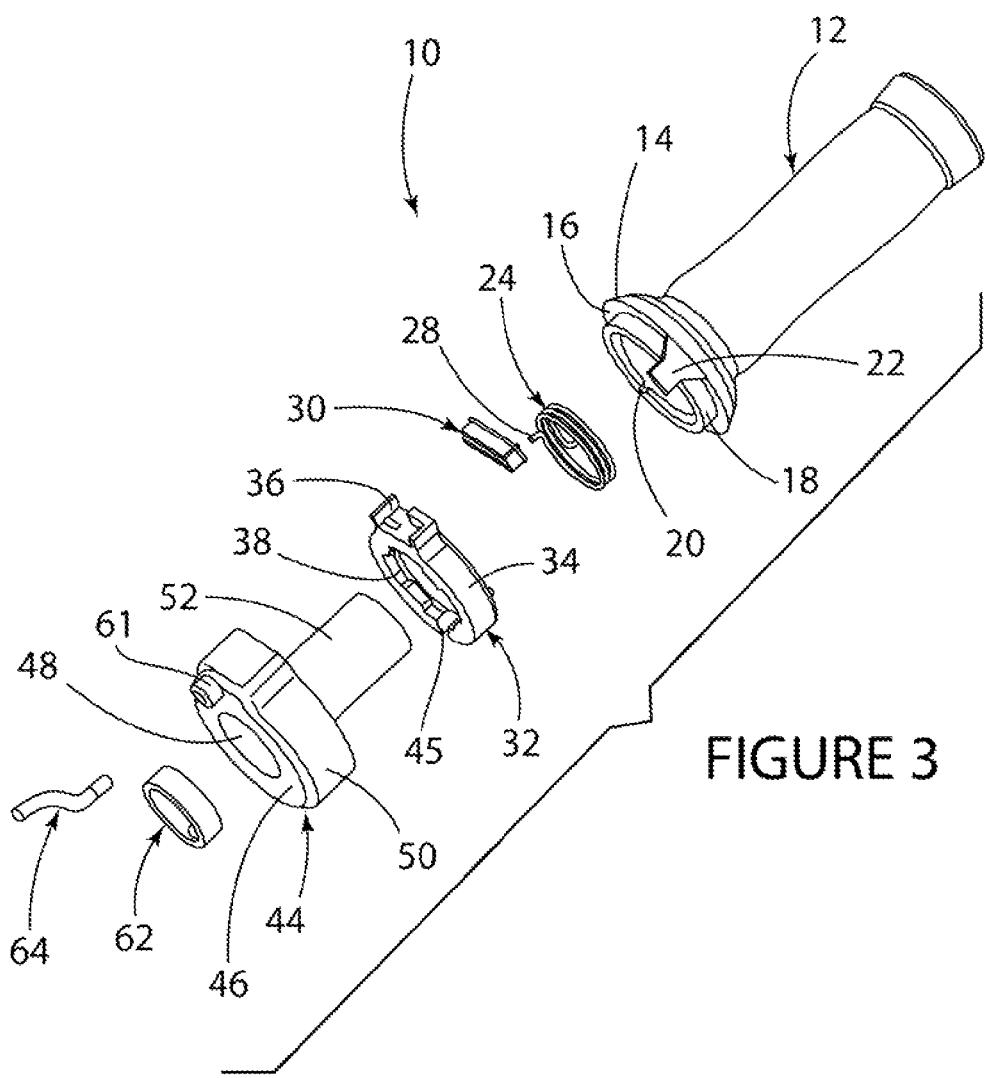

As shown in detail in FIGS. 1A, 2 and 3, the throttle twist grip controller assembly 10 initially comprises an elongated, generally cylindrically-shaped handle grip 12 which may be made of any suitable elastomeric material and defines an elongated open interior (FIG. 1A) adapted to receive the distal elongate end 202 of the handlebar 200 when the handle grip 12 is slid onto and fitted onto the end 202 of the handlebar 200. Thus, when mounted to the handlebar 200, the handle grip 12 is twistable/rotatable about and relative to the distal end of the handlebar 200.

As also shown in FIGS. 1A, 2 and 3, the handle grip 12 includes a handle drive element or structure 14 unitary with the proximal end thereof which, in the embodiment shown, is in the form of a circumferentially extending flange unitary with the proximal end of the handle grip 12. The flange 14 includes an exterior, circumferentially extending flat outer surface 16 (FIG. 3) having a generally ring-shaped circumferentially extending shoulder or abutment wall 18 (FIGS. 1A and 3) projecting outwardly therefrom. The abutment wall 18 includes an interior surface defining at least a first recess or groove 20 (FIG. 3). A tab 22 (FIGS. 2 and 3) protrudes generally normally outwardly from the exterior surface 16.

As shown in FIGS. 1A, 2 and 3, throttle twist grip controller assembly 10 further comprises a spiral spring 24 including opposed ends 26 (FIG. 2) and 28 (FIG. 3) projecting generally normally outwardly from the body of the spiral spring 24 in a relationship generally parallel to the longitudinal axis of the assembly 10. Throttle twist grip controller assembly 10 still further comprises a cover 30 for the terminal housing 36 of the ring potentiometer assembly 32.

Figure 4:
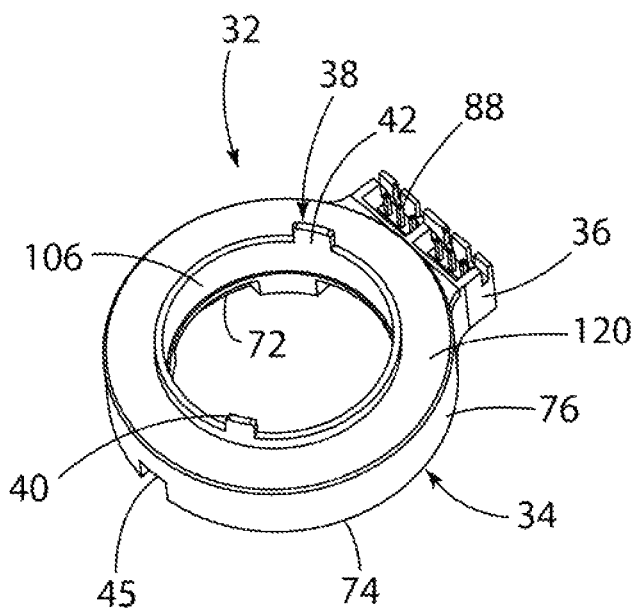
FIG. 4 is a perspective view of the ring potentiometer assembly of the throttle twist grip controller assembly shown in FIGS. 1-3.
Figure 5:
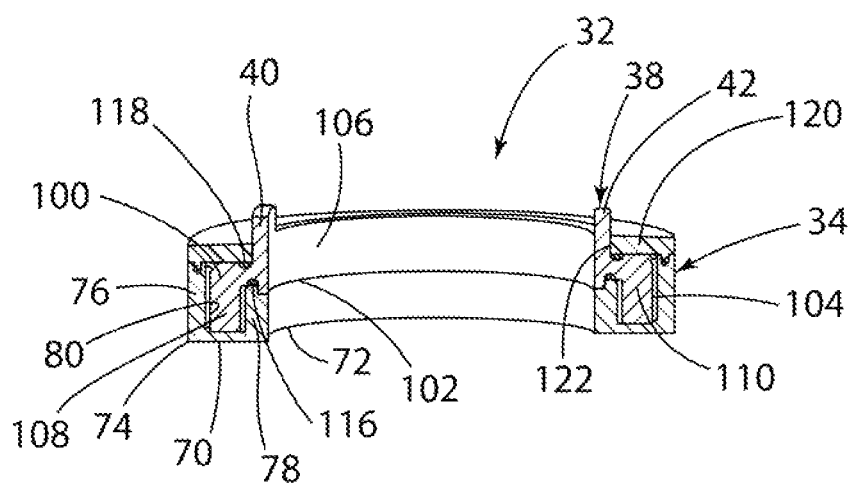
FIG. 5 is a vertical cross-sectional view of the ring potentiometer assembly shown in FIG. 4.

As shown in FIGS. 1A, 2, 3, and 4, the throttle twist grip controller assembly 10 further comprises a generally ring- or doughnut-shaped potentiometer assembly 32 which may be made from any suitable elastomeric material. Ring potentiometer assembly 32 includes a generally ring- or doughnut-shaped potentiometer housing 34 defining a central through aperture or opening; a generally rectangularly-shaped terminal housing 36 unitary with the potentiometer housing 34; and a ring-shaped rotor 38 which is fitted in the housing 34, defines a central through aperture or opening, and includes a pair of opposed outwardly projecting tabs 40 and 42 (FIGS. 2, 4, and 5). Potentiometer housing 34 also defines at least a first exterior groove or recess 45 (FIGS. 2, 3, and 4).

Referring to FIGS. 1A, 2, and 3, the throttle twist grip controller assembly 10 still further comprises a throttle housing assembly 44 including a generally ring- or doughnut-shaped base plate 46 defining a central, generally circular through aperture 48 (FIGS. 1A and 3), an outside circumferential wall 50 extending generally normally outwardly from an outer peripheral edge of the plate 46, and an interior elongated, hollow, generally cylindrically-shaped sleeve 52 extending generally normally outwardly from the inner peripheral edge of the plate 46 defining the central aperture 48. The circumferential sleeve 52 is positioned in a relationship spaced from and generally parallel to the circumferential wall 50. The sleeve 52 additionally includes and defines a shoulder or flange 54 (FIGS. 1A and 2) adjacent the plate 46. Throttle housing assembly 44 may also be made from any suitable elastomeric material.

As shown in FIGS. 1A and 2, the plate 46, the circumferential wall 50, and the circumferential sleeve 52 together define a circumferentially extending interior slot or recess or pocket 56 in the throttle housing assembly 44. The plate 46 and a portion of the wall 50 also together define a generally rectangularly-shaped pocket or recess 58 (FIGS. 1A and 2). An exterior sleeve 61 (FIGS. 1A and 3) defining a through-hole 60 (FIGS. 1A and 2) is also defined in a portion of the plate 46 defining the pocket 58.

As shown in FIGS. 2 and 3, throttle twist grip controller assembly 10 still further comprises a metallic generally ring-shaped security ring 62 (FIGS. 1A, 2, and 3) defining an aperture 47 (FIGS. 1A and 2).

As shown in FIGS. 1A, 2, and 3, the ring potentiometer assembly 32 is fitted and slid over and along the length of the sleeve 52 of throttle housing assembly 44 into a relationship wherein the ring potentiometer assembly 32 is fitted and seated in the slot or pocket 56 defined in the throttle housing assembly 44 with the exterior wall 50 of the housing assembly 44 surrounding the housing 34 of the ring potentiometer assembly 32 and the housing 34 and the rotor 38 of ring potentiometer assembly 32 surrounding the sleeve 52 and, more specifically, surrounding the exterior circumferential surface of the interior shoulder 54, and the terminal housing 36 is fitted in the pocket 58 of throttle housing assembly 44.

A tab 71 (FIG. 2) is formed on, and protrudes outwardly from, the interior surface of the wall 50 of throttle housing assembly 44 and is received in the groove 45 (FIG. 2) of the ring potentiometer assembly 32 to fix and prevent the rotation of the ring potentiometer assembly 32 relative to the throttle housing assembly 44.

Security ring 62 is fitted into the sleeve opening 48 defined in the base plate 46 of the throttle housing assembly 44 (FIGS. 1A and 3). Cover 30 is fitted over the terminal housing 36 of the ring potentiometer assembly 32.

The spiral spring 24 is fitted and slid over and along the length of sleeve 52 of the throttle housing assembly 44 and into the slot or pocket 56 defined in the throttle housing assembly 44 into a relationship wherein: the spring 24 is abutted and seated against the top peripheral end face of the shoulder 54 and surrounds the sleeve 52; a portion of the ring potentiometer assembly 32 surrounds a portion of the spring

24; and the end 28 of the spring 24 is fitted into a groove (not shown) defined in the throttle housing assembly 44.

The handle grip 12 is fitted over and coupled to the throttle housing assembly 44 in a relationship wherein: the flange 14 on the handle grip 12 is abutted against the top peripheral end face of the circumferential wall 50 of the throttle housing assembly 44; the end 26 of the spiral spring 24 is fitted into a groove 20 defined in the interior of the handle grip 12; and the rotor tabs 40 and 42 on the rotor 38 of ring potentiometer assembly 32 are fitted into respective grooves or recesses (not shown) also defined in the interior of the handle grip 12.

The throttle twist grip controller assembly 10 is in turn fitted to the handlebar 200 and, more specifically, is fitted and extended over the distal end 202 of the handlebar 200. Still more specifically, the distal end 202 of handlebar 200 extends successively through the ring 62 fitted in the spring 48 of the throttle housing assembly 44 aperture, the interior of the sleeve 52 of the throttle housing 44, and through the interior of the handle grip 12. A screw 49 (FIGS. 1 and 1A) is inserted in and through the throttle housing assembly 44 and into and through the aperture 47 (FIGS. 1A and 2) defined in the security ring 62 for securing the throttle housing assembly 44, and thus the throttle twist grip controller assembly 10, to the distal end 202 of the handlebar 200.

Although not shown or described in detail, it is understood that a wire 64 (FIGS. 1, 2, and 3) includes one end extending into the sleeve 61 and through the plate 46 of the throttle housing assembly 44 and into the terminal housing 36 of the ring potentiometer assembly 32. The other end (not shown) of the wire 64 is coupled to the control of the engine or motor of the vehicle.

Thus, and referring back to FIG. 1, the handle grip 12 is adapted to rotate relative to both the handlebar 200 and the throttle housing assembly 44 in response to the application of a rotation force on the handle grip 12 by the hand of the operator of the vehicle which then, in turn, causes the rotation of the rotor 38, of the ring potentiometer assembly 32, located in the interior of the throttle housing assembly 44 and coupled to the handle grip 12.

Because the spring 24 is coupled to both the handle grip 12 and the throttle housing assembly 44, the handle grip 12 is spring-loaded relative to the throttle housing assembly 44 and the handle grip 12 is adapted to return to its idle position when the rotating force, i.e., the operator's hand, is removed from the handle grip 12. The tab 22 on the flange 14 of the handle grip 12 defines a stop which is adapted to abut against a shoulder or recess defined in the interior of the throttle housing 44 and is adapted to limit the rotation of the handle grip 12 relative to the handlebar 200 and the throttle housing 44.

The structure of the ring potentiometer assembly 32 of the present invention will now be described in more detail with reference to FIGS. 4, 5, 6, 7, and 8 and, still more specifically, FIG. 6 which shows a dual output embodiment of the ring potentiometer assembly 32 and FIGS. 7 and 8 which shows a single output embodiment of the ring potentiometer assembly 32.

As described above, the ring potentiometer assembly 32 comprises two main components: the ring- or doughnut-shaped potentiometer/rotor housing 34 and unitary terminal housing 36 (FIGS. 4, 5, 6, 7, and 8); and the ring-shaped rotor 38 (FIGS. 4, 5, 6, and 7).

The potentiometer housing 34 (FIGS. 4, 5, 6, 7, and 8) includes a generally ring-shaped horizontal base plate 70 (FIGS. 5 and 8) including an interior circumferential edge 72 (FIGS. 4, 5, 6, 7, and 8) and defining an interior central aperture, an exterior peripheral circumferential edge 74 (FIGS. 4, 5, 6, and 7), a circumferential outer wall 76 (FIGS. 4, 5, 6, 7, and 8) projecting generally normally vertically and outwardly from the exterior peripheral circumferential edge 74 of the base plate 70, and a shorter circumferential interior wall 78 (FIGS. 4, 5, 6, 7, and 8) projecting generally normally and vertically outwardly from the interior peripheral edge 72 of the base plate 70 in a relationship spaced and generally parallel to the circumferential wall 76. The base plate 70 and the respective exterior and interior walls 76 and 78 together define a generally U-shaped circumferentially extending slot or groove 80 (FIG. 5) in the interior of the potentiometer housing 34.

The terminal housing 36 is unitary with the potentiometer housing 34 and, more specifically, is unitary with the exterior peripheral outer wall 76 of the potentiometer housing 34. As shown in FIGS. 7 and 8, the potentiometer housing 34 also comprises a pressure wall 79 located opposite and spaced from the exterior peripheral outer wall 76 and the terminal housing 36. The space between the walls 76 and 79 defines a wedge/terminal pocket 81 in the potentiometer housing 34 as described in more detail below.

Figure 6:
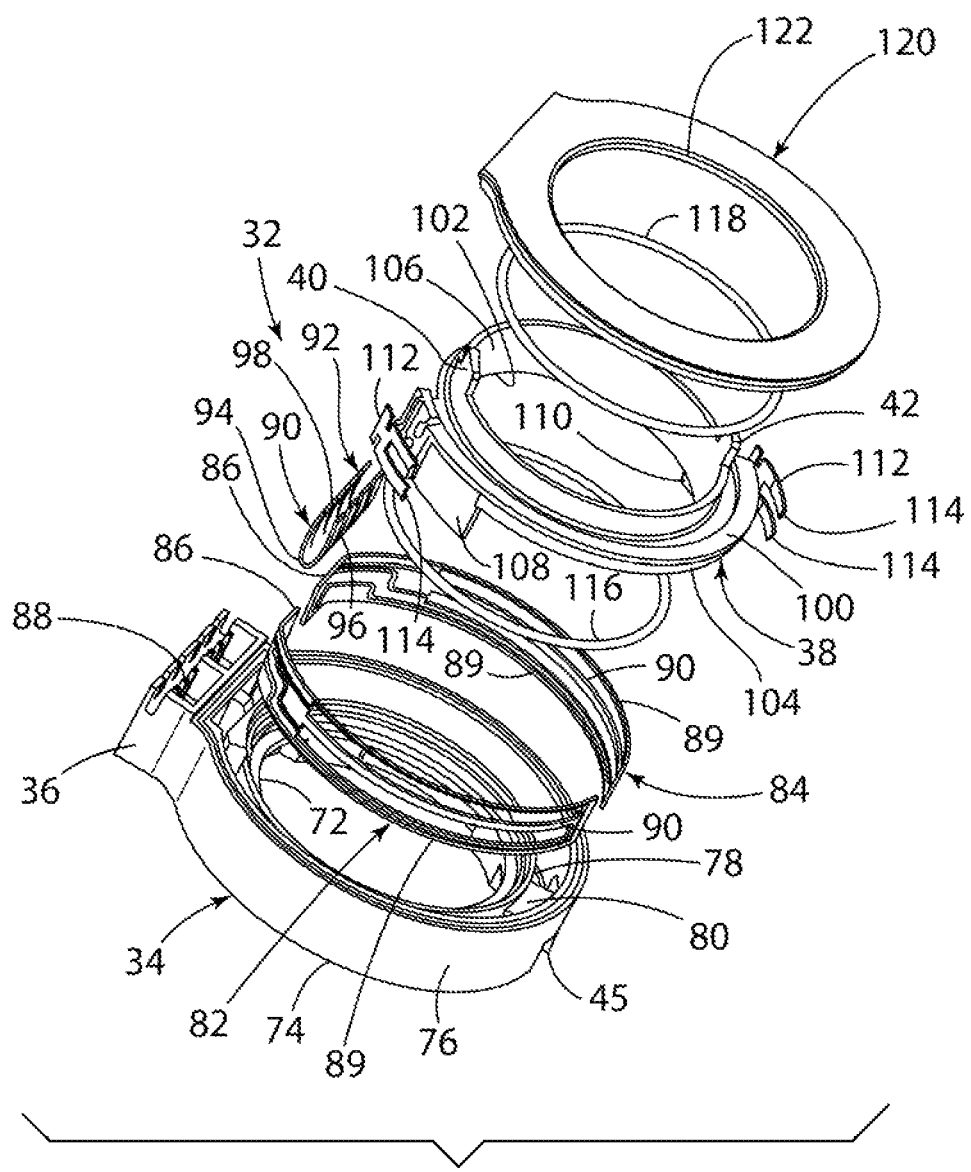
FIG. 6 is an exploded perspective view of a dual output embodiment of the ring potentiometer assembly shown in FIGS. 4 and 5.

The ring potentiometer assembly 32 of FIG. 6 also comprises a pair of elongated strips of flexible resistive film material 82 and 84, each including a generally straight base portion 86 and a curvilinearly-shaped or arcuate arm portion 89 extending unitarily outwardly from the base portion 86. Each of the arm portions 89 includes a plurality of elongate resistance elements and/or traces 90 formed on the interior surface thereof which couple to respective resistance pads (not shown) formed on the interior surface of the respective base portion 86 of each of the respective strips of film 82 and 84.

The film strip 82 is adapted to be fitted into the right half arcuate portion of the slot 80 defined in the potentiometer housing 34 of the ring potentiometer assembly 32 of FIG. 6 in a relationship wherein the exterior surface of the film strip 82 is abutted against the interior surface of the exterior circumferential wall 76 of the potentiometer housing 34 and the base portion 86 thereof is located in the wedge/terminal end pocket 81 of the potentiometer housing 34.

The film strip 82 shown in FIG. 6 is fitted into the slot 80 of the ring potentiometer assembly 32 in the same manner as the strip 84.

Figure 8:
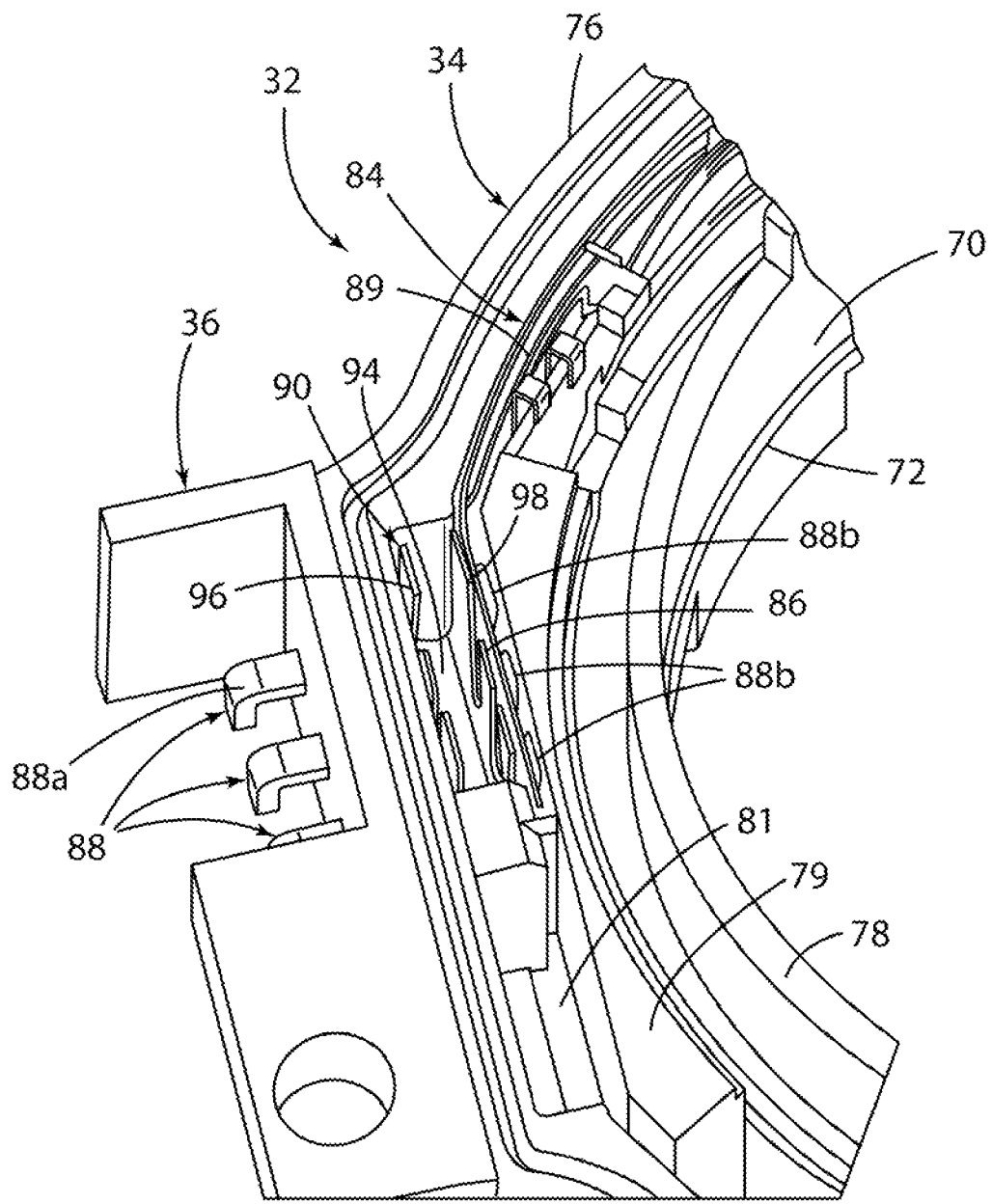
FIG. 8 is an exploded, broken, perspective view of the terminal housing and wedge pocket of the single output embodiment of the ring potentiometer assembly shown in FIG. 7.

As shown in FIG. 8, the film strip 84 is fitted into the left half arcuate portion of the slot 80 defined in the potentiometer housing 34 in a relationship wherein the exterior surface of the film strip 84 is abutted against the interior surface of the exterior circumferential wall 76 of the potentiometer housing 34 with the base portion 86 of the film strip 84 located and extending into the wedge/terminal end pocket 81 of the potentiometer housing 34.

As shown in FIGS. 4, 6, and 8, a plurality of metallic terminals 88 are located and secured in the terminal housing portion 36 of the potentiometer housing 32. The generally hook-shaped end 88*a* of each of the terminals 88, as shown in the single output potentiometer embodiment of FIG. 8, protrudes out of the terminal housing 36. The other end 88*b* of each of the terminals 88 extends through the potentiometer housing wall 76 and into the interior of the wedge pocket 81 into a relationship wherein one side of each of the terminal ends 88*b* is located adjacent and opposed to the interior surface of the pressure wall 79 and the other side of each of the terminal ends 88*b* is located opposite the base portion 86 of the film strip 84 and, more specifically, is located opposite a respective conductive pad thereof.

The dual output ring potentiometer assembly embodiment 32 of FIGS. 4, 5, and 6 still further comprises a pair of generally V-shaped metallic film strip pressure wedges 90 and 92. The single output ring potentiometer assembly embodiment 32 of FIGS. 7 and 8 comprises only the generally V-shaped metallic pressure wedge 90. Each of the pressure wedges 90 and 92 includes a base 94 (FIGS. 6, 7, and 8) and two rows of opposed pressure fingers 96 and 98 (FIGS. 6, 7, and 8).

As shown in FIG. 8, the wedge 90 is fitted in the wedge pocket 81 defined in the potentiometer housing 34 in a relationship wherein the base 94 thereof is abutted against the interior surface of the plate 70 of the potentiometer housing 34; the fingers 96 are abutted against the interior surface of the exterior wall 76 of the potentiometer housing 34; and the fingers 98 are abutted against and force the base portion 86 of the strip 84 and, more specifically, the respective conductive pads thereon, into abutting relationship against the respective ends 88b of the respective terminals 88.

Although not shown in any of the FIGURES, it is understood that both of the wedges 90 and 92 of the dual output potentiometer assembly 32 shown in FIG. 6 are adapted to be fitted in the potentiometer assembly 32 of FIG. 6 in the same manner as the wedge 90 of the single output ring potentiometer embodiment 32 shown in FIG. 8.

As also shown in FIGS. 5 and 6, the ring-shaped rotor 38 of the ring potentiometer assembly 32 includes a generally ring-shaped vertical wall 106 (FIGS. 4, 5, and 6) having an interior surface disposed generally flush, and co-planar, with the exterior surface of the interior wall 78 of the potentiometer housing 34 and defining a central through aperture or opening; and a generally horizontally oriented base or plate member 100 which protrudes generally normally unitarily outwardly from the exterior surface of the vertical wall 106, extends partially around the circumference of the vertical wall 106 and defines an exterior peripheral arcuate edge 104.

The tabs 40 and 42 (FIGS. 4 and 6) and the additional tab 43 (FIG. 5) project outwardly from, and are spaced around, the top peripheral edge of the circumferential wall 106. A pair of opposed contactor tabs 108 and 110 (FIGS. 5 and 6) project generally normally outwardly from the exterior peripheral circumferential edge 104 of the plate 100 in a direction opposite the interior circumferential wall 106 and the tabs 40 and 42.

A metal contactor 112 (FIG. 6) is coupled to the outside surface of each of the contactor tabs 108 and 110. Each of the contactors 112 in turn includes a pair of spaced-apart and parallel wiper blades or fingers 114 (FIG. 6) extending in the same direction as the strips of film 82 and 84.

Ring potentiometer assembly 32 still further comprises a pair of O-rings 116 and 118 (FIGS. 5 and 6) and a generally ring-shaped assembly cover 120. The cover 120 includes an interior circumferential edge 122 defining an interior aperture.

The ring rotor 38 is seated and located in the potentiometer housing 32 for rotation relative to the potentiometer housing 32 in a relationship wherein: the rotor wall 106 and the interior potentiometer housing wall 78 and, more specifically, the respective exterior surfaces thereof, are flush and generally co-planar with each other; the contactor tabs 108 and 110 are fitted in and extend into the slot 80 defined in the potentiometer housing 32 (FIG. 5); the wiper fingers 114 of contactors 112 which are coupled to the contactor tabs 108 and 110 are fitted and extend into the slot 80 and are abutted against the respective resistive elements 90 on respective film strips 82 and 84 (not shown); and the lower surface of the plate 100 is seated against the top peripheral edge of the interior wall 78 of the potentiometer housing 34 for sliding movement relative to and against the top peripheral edge of the interior potentiometer housing wall 78.

The O-ring 116 is sandwiched between the top peripheral edge of the interior wall 78 of the potentiometer housing 34 and the lower surface of the plate 100 of the rotor 38. As also shown in FIG. 5, the cover 120 is seated against both the top peripheral end face of the exterior wall 76 of the potentiometer housing 34 and the top surface of the plate 100 of the rotor 38. The O-ring 118 is sandwiched between the lower surface of the cover 120 and the upper surface of the plate 100 of the rotor 38. The O-rings 116 and 118 seal and protect the contactors 112 and the films 82 and 84 in the housing 34 from the outside environment.

As described above, the rotation of the handle grip 12 causes the rotation of the rotor 38 relative to the potentiometer housing 34 which, in turn, causes the contactor fingers 114 to slide on and along the length of the respective resistive elements 90 formed on the surface of the respective films 82 and 84 which, in turn changes the resistance value which, in turn, then allows the position of the handle grip 12 relative to the handlebar 200 to be sensed and measured which, in turn, then allows an electronic engine or motor control (not shown) coupled to the other end (not shown) of the wire 64 to increase or decrease power to the vehicle engine or motor.

Although not described in any detail herein, it is understood that the single output embodiment of the ring potentiometer assembly 32 shown in FIGS. 7 and 8 is identical in all respects in structure and operation to the dual output embodiment shown and described above with respect to FIGS. 4, 5, and 6 except that, as described above, the single output embodiment shown in FIGS. 7 and 8 includes only one film element 84 located in the potentiometer housing 32, one pressure wedge 90 located in the wedge pocket 81 in potentiometer housing 32, one contactor 112 coupled to the tab 108 on the rotor 38, and only three terminals 88 in the terminal housing portion 36 of the potentiometer housing 34 and extending into the wedge pocket 81 of the potentiometer housing 34.

Figure 7:
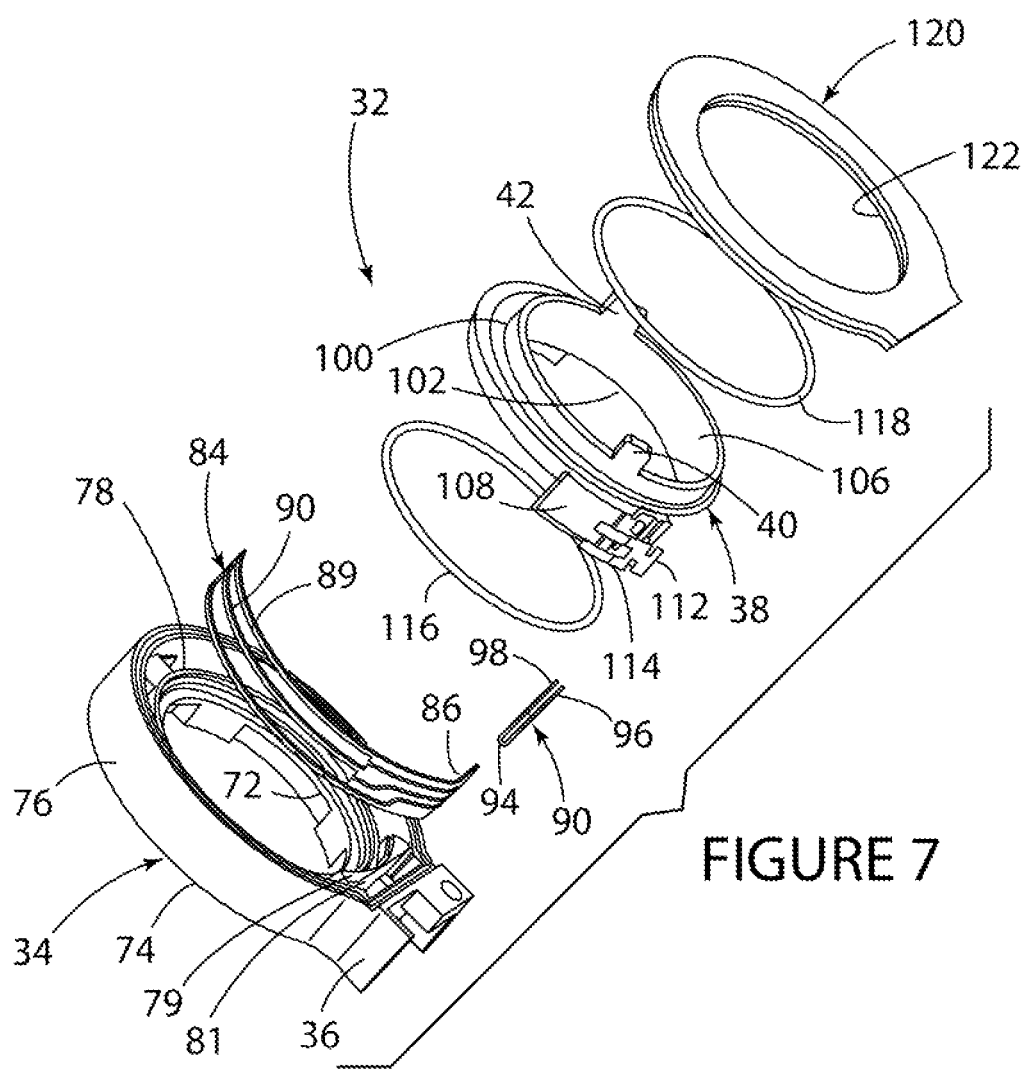
FIG. 7 is an exploded perspective view of a single output embodiment of the ring potentiometer assembly shown in FIGS. 4 and 5.

All of the other elements identified in FIGS. 7 and 8 are identical to the elements identified in FIG. 6 with like numerals and thus the description thereof with respect to the dual output embodiment of FIG. 6 is incorporated herein by reference with respect to FIGS. 7 and 8.

Numerous variations and modifications of the throttle twist grip controller assembly and ring potentiometer embodiments described above may be effected without departing from the spirit and scope of the novel features of the invention. It is thus understood that no limitations with respect to either the throttle twist grip controller assembly or the associated ring potentiometer assembly illustrated herein are intended or should be inferred. It is, of course, intended to cover by the appended claims all such modifications as fall within the scope of the claims.

We claim:
1. A throttle twist grip controller assembly comprising:
a rotatable handle grip;
a throttle housing; and
a ring-shaped potentiometer assembly including a ring-shaped potentiometer housing located in and surrounded by the throttle housing and defining an interior slot with a strip of resistive material located therein, the ring-shaped potentiometer assembly further including a rotatable ring-shaped rotor fitted in the interior slot of the ring-shaped potentiometer housing and including a contactor adapted to slide on and along the strip of resistive material in response to the rotation of the ring-shaped rotor and the ring-shaped rotor being coupled to the handle grip for rotation with the handle grip.

2. The throttle twist grip controller assembly of claim 1, wherein the ring-shaped potentiometer assembly and the ring-shaped rotor define respective central apertures for fitting the ring-shaped potentiometer assembly in a relationship surrounding a sleeve.

3. The throttle twist grip controller assembly of claim 1, wherein the handle grip defines a longitudinal axis, the ring-shaped potentiometer housing has a pair of spaced-apart walls and a base together defining a generally U-shaped interior slot, the pair of spaced-apart walls extending in the same direction as the longitudinal axis of the handle grip, the strip of resistive material being fitted in the slot in the ring-shaped potentiometer housing between the ring-shaped rotor and one of the pair of spaced-apart walls defining the slot.

4. A throttle controller assembly comprising:
 a rotatable handle grip;
 a throttle housing coupled to the rotatable handle grip and including a sleeve; and
 a ring-shaped potentiometer assembly including a ring-shaped potentiometer housing surrounding the sleeve and surrounded by the throttle housing, the ring-shaped potentiometer assembly further including a ring-shaped rotor surrounding the sleeve and surrounded by and fitted in the ring-shaped potentiometer housing and coupled for rotation with the handle grip.

5. The throttle controller assembly of claim 4, wherein the sleeve defines a longitudinal axis the ring-shaped potentiometer housing includes a pair of spaced-apart walls defining an interior slot and extending in the same direction as the longitudinal axis of the sleeve, the ring-shaped rotor being fitted in the slot, each of the ring-shaped potentiometer housing and the ring-shaped rotor defines a central aperture, the sleeve of the throttle housing extending through the central aperture of the ring-shaped potentiometer housing and the ring-shaped rotor respectively.

6. The throttle control assembly of claim 4, wherein the rotor includes at least one tab fitted in a groove defined in the throttle housing and the throttle housing includes at least one tab fitted in a groove in the potentiometer assembly.

7. A potentiometer assembly comprising:
 a ring-shaped potentiometer housing including a first wall and defining a slot;
 a ring-shaped rotor fitted in the potentiometer housing for rotation relative to the potentiometer housing and including at least a first contactor extending into the slot;
 at least a first strip of resistive material fitted in the slot in the potentiometer housing between the first wail and the first contactor, the contactor adapted to slide on and along the strip of resistive material in response to the rotation of the ring-shaped rotor.

8. The potentiometer assembly of claim 7, wherein the potentiometer housing includes a second wall spaced from the first wall and together defining the slot, the second wall including a top peripheral edge and the rotor including a rotor plate seated against the top peripheral edge of the second wall.

9. The potentiometer assembly of claim 8, wherein the rotor includes at least a first tab extending from the rotor plate and fitted in the slot in the potentiometer housing and adapted to hold the contactor.

10. The potentiometer assembly of claim 9, wherein the rotor includes at least a second tab adapted for coupling to a rotatable control element, the second tab extending from the rotor plate in a direction opposite the first tab.

11. The potentiometer assembly of claim 7, wherein the ring-shaped potentiometer housing include the first wall, a second wall opposed to the first wall and a base together defining the slot, each of the ring-shaped potentiometer housing and the ring-shaped rotor defines a central through aperture for mounting the potentiometer assembly in a relationship surrounding a sleeve and the ring-shaped potentiometer housing surrounding the ring-shaped rotor.

* * * * *